(12) United States Patent
Yang et al.

(10) Patent No.: US 12,030,526 B2
(45) Date of Patent: Jul. 9, 2024

(54) SYSTEM AND METHOD FOR CONTROLLING AUTONOMOUS UN-PARKING OF VEHICLE

(71) Applicants: HYUNDAI MOTOR COMPANY, Seoul (KR); Kia Corporation, Seoul (KR)

(72) Inventors: Hee Gun Yang, Anyang-si (KR); Min Kyo Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 92 days.

(21) Appl. No.: 17/404,432

(22) Filed: Aug. 17, 2021

(65) Prior Publication Data

US 2022/0089194 A1 Mar. 24, 2022

(30) Foreign Application Priority Data

Sep. 21, 2020 (KR) .................. 10-2020-0121745

(51) Int. Cl.
*B60W 60/00* (2020.01)
*B60W 30/06* (2006.01)
*B60W 50/08* (2020.01)
*G01C 21/34* (2006.01)

(52) U.S. Cl.
CPC ...... *B60W 60/00253* (2020.02); *B60W 30/06* (2013.01); *B60W 50/087* (2013.01); *G01C 21/3438* (2013.01); *G01C 21/3492* (2013.01); *B60W 2540/043* (2020.02); *B60W 2540/049* (2020.02); *B60W 2540/215* (2020.02); *B60W 2556/50* (2020.02)

(58) Field of Classification Search
None
See application file for complete search history.

(56) References Cited

U.S. PATENT DOCUMENTS

| | | | |
|---|---|---|---|
| 10,152,053 B1* | 12/2018 | Smith | G06Q 10/02 |
| 2019/0063935 A1* | 2/2019 | Badalamenti | G01C 21/3438 |
| 2019/0228664 A1* | 7/2019 | Seki | G06Q 10/02 |
| 2020/0194008 A1* | 6/2020 | Lee | H04L 63/0861 |
| 2020/0290649 A1* | 9/2020 | Yamane | B60K 35/00 |
| 2021/0365042 A1* | 11/2021 | Donnelly | G08G 1/096725 |
| 2021/0389141 A1* | 12/2021 | Inoue | G08G 1/096716 |

* cited by examiner

*Primary Examiner* — Hongye Liang
(74) *Attorney, Agent, or Firm* — MORGAN, LEWIS & BOCKIUS LLP (57) ABSTRACT

An autonomous un-parking system and method of a vehicle that identify a user when un-parking a parked vehicle to propose a user-based boarding location, and control user-customized autonomous un-parking, may include a communication terminal of a user, a communication device disposed in a vehicle to receive an un-parking request of the vehicle from the communication terminal, and a controller disposed in the vehicle to determine a boarding location based on the user in a response to the un-parking request, and to control un-parking of the vehicle to the determined boarding location.

20 Claims, 9 Drawing Sheets

SYSTEM AND METHOD FOR CONTROLLING AUTONOMOUS UN-PARKING OF VEHICLE

CROSS-REFERENCE TO RELATED APPLICATION

The present application claims priority to Korean Patent Application No. 10-2020-0121745, filed on Sep. 21, 2020, the entire contents of which is incorporated herein for all purposes by this reference.

BACKGROUND OF THE INVENTION

Field of the Invention

The present invention relates to an autonomous un-parking system and an autonomous un-parking method of a vehicle, and more specifically, to a system and a method for identifying a user when un-parking a parked vehicle, proposing a user-based boarding location, and controlling user-customized autonomous un-parking.

Description of Related Art

An autonomous driving technology of a vehicle is a technology in which the vehicle travels while recognizing, determining, and controlling a surrounding environment and a vehicle status by itself even when a driver does not directly control a brake, a steering wheel, and an accelerator pedal.

A digital key technology is a new vehicle key technology which may not only open and lock a door of the vehicle with a smartphone, but also start the vehicle. The door of the vehicle is unlocked by touching the (unlocked) smartphone unlocked to the door in the vicinity of an external handle of a driver's seat using an NFC technology.

However, there is an inconvenience of having to directly approach a parking lot and tag the smartphone to perform un-parking of the vehicle even when using a digital key.

Therefore, there is a demand for a technology of combining the autonomous driving technology with a user authentication technology of the digital key, determining a user-based boarding location when a user wants un-parking, and un-parking the vehicle, promoting user convenience.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing autonomous un-parking system and method.

Various aspects of the present invention provide autonomous un-parking system and method for determining a customized boarding location based on a user and performing autonomous un-parking to the boarding location.

Various aspects of the present invention provide autonomous un-parking system and method for determining a boarding location based on a past un-parking history of a user.

Various aspects of the present invention provide autonomous un-parking system and method for determining a boarding location in consideration of weather information.

Various aspects of the present invention provide autonomous un-parking system and method for providing information on boarding location candidates to a user and determining a boarding location based on a boarding location candidate selected by the user.

Various aspects of the present invention provide autonomous un-parking system and method for performing un-parking in consideration of information on the number of passengers and a cargo.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an autonomous un-parking system includes a communication terminal of a user, a communication device disposed in a vehicle to receive an un-parking request of the vehicle from the communication terminal, and a controller disposed in the vehicle to determine a boarding location based on the user in a response to the un-parking request, and to control un-parking of the vehicle to the determined boarding location.

In various exemplary embodiments of the present invention, the communication terminal may include user authentication means, and the controller may identify the user according to the user authentication means.

In various exemplary embodiments of the present invention, the controller may select one or more boarding location candidates based on the user, and determine the boarding location based on a boarding location candidate selected by the user among the one or more boarding location candidates, and the communication device may transmit information on the one or more boarding location candidates to the communication terminal, and receive information on the boarding location candidate selected by the user from the communication terminal.

In various exemplary embodiments of the present invention, the controller may identify a past boarding history of the user based on the user and the boarding information for each user, determine the boarding location based on the past boarding history of the user, and update the boarding information for each user when the user boards the vehicle.

In various exemplary embodiments of the present invention, the controller may be configured to determine the boarding location based on information on a weather obtained through an AVN of the vehicle and the user.

In various exemplary embodiments of the present invention, the communication device may receive information on the number of passengers or a cargo from the communication terminal, and the controller may be configured to control the vehicle to be parked or stopped in consideration of a free space around the vehicle or a direction of a trunk of the vehicle that are determined to be convenient for the user to board the vehicle or load the cargo based on the number of passengers or the cargo.

In various exemplary embodiments of the present invention, the controller may set, based on the user, an environment of the vehicle including at least one of a seat location, an air conditioner, a radio, or a steering wheel location of the vehicle.

In various exemplary embodiments of the present invention, the communication device may receive information on a time that the user wants to board the vehicle from the communication terminal, and the controller may be configured to control the un-parking to the boarding location in consideration of the time.

In various exemplary embodiments of the present invention, the controller may select one or more boarding location candidates when a weather different from the weather obtained through the AVN device is detected during the un-parking, based on the user and the different weather, and re-determine the boarding location based on a boarding location candidate selected by the user among the one or more boarding location candidates, and the communication device may transmit information on the one or more boarding location candidates to the communication terminal, and receive information on the boarding location candidate selected by the user from the communication terminal.

In various exemplary embodiments of the present invention, the controller may transmit information indicating that the un-parking has been completed to the communication terminal through the communication device when the un-parking is completed.

In various exemplary embodiments of the present invention, the controller may transmit a message requesting confirmation to the communication terminal through the communication device when the user does not board the vehicle for a certain time period after the un-parking has completed, obtain, through the communication terminal, a selection of the user on whether the vehicle will wait at a current location or will be parked after returning to an original parking location, and control the vehicle based on the selection of the user.

According to various aspects of the present invention, an autonomous un-parking method includes receiving an un-parking request of a vehicle from a communication terminal, determining a boarding location based on a user in a response to the un-parking request, and controlling un-parking of the vehicle to the determined boarding location.

In various exemplary embodiments of the present invention, the communication terminal may include user authentication means, and the determining of the boarding location based on the user in the response to the un-parking request may include determining the boarding location based on the user identified through the user authentication means.

In various exemplary embodiments of the present invention, the determining of the boarding location based on the user in the response to the un-parking request may include selecting one or more boarding location candidates based on the user, transmitting information on the one or more boarding location candidates to the communication terminal, receiving information on a boarding location candidate selected by the user from the communication terminal, and determining the boarding location based on the boarding location candidate selected by the user.

In various exemplary embodiments of the present invention, the autonomous un-parking method may further include updating boarding information for each user when the user boards the vehicle, and the determining of the boarding location based on the user in the response to the un-parking request may include identifying a past boarding history of the user based on the user and the boarding information for each user, and determining the boarding location based on the past boarding history of the user.

In various exemplary embodiments of the present invention, the determining of the boarding location based on the user may include determining the boarding location based on information on a weather obtained through an AVN of the vehicle and the user.

In various exemplary embodiments of the present invention, the autonomous un-parking method may further include receiving information on a number of passengers or a cargo from the communication terminal, and the controlling of the un-parking of the vehicle to the boarding location may include controlling the vehicle to be parked or stopped in consideration of a free space around the vehicle or a direction of a trunk of the vehicle that are determined to be convenient for the user to board the vehicle or load the cargo based on the number of passengers or the cargo.

In various exemplary embodiments of the present invention, the autonomous un-parking method may further include setting, based on the user, an environment of the vehicle including at least one of a seat location, an air conditioner, a radio, or a steering wheel location of the vehicle.

In various exemplary embodiments of the present invention, the autonomous un-parking method may further include receiving information on a time that the user wants to board the vehicle from the communication terminal, and the controlling of the un-parking of the vehicle to the boarding location may include controlling the un-parking to the boarding location in consideration of the time.

In various exemplary embodiments of the present invention, the autonomous un-parking method may further include selecting one or more boarding location candidates when a weather different from the weather obtained through the AVN device is detected during the un-parking, based on the user and the different weather, transmitting information on the one or more boarding location candidates to the communication terminal, receiving information on a boarding location candidate selected by the user from the communication terminal, re-determining the boarding location based on the boarding location candidate selected by the user, and performing the un-parking to the re-determined boarding location.

In various exemplary embodiments of the present invention, the autonomous un-parking method may further include transmitting information indicating that the un-parking has been completed to the communication terminal when the un-parking is completed.

In various exemplary embodiments of the present invention, the autonomous un-parking method may further include transmitting a message requesting confirmation to the communication terminal when the user does not board the vehicle for a certain time period after the un-parking has completed, obtaining, through the communication terminal, a selection of the user on whether the vehicle will wait at a current location or will be parked after returning to an original parking location, and controlling the vehicle based on the selection of the user.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, FIG. 5, FIG. 6, FIG. 7, FIG. 8 and FIG. 9.

Figure 1:
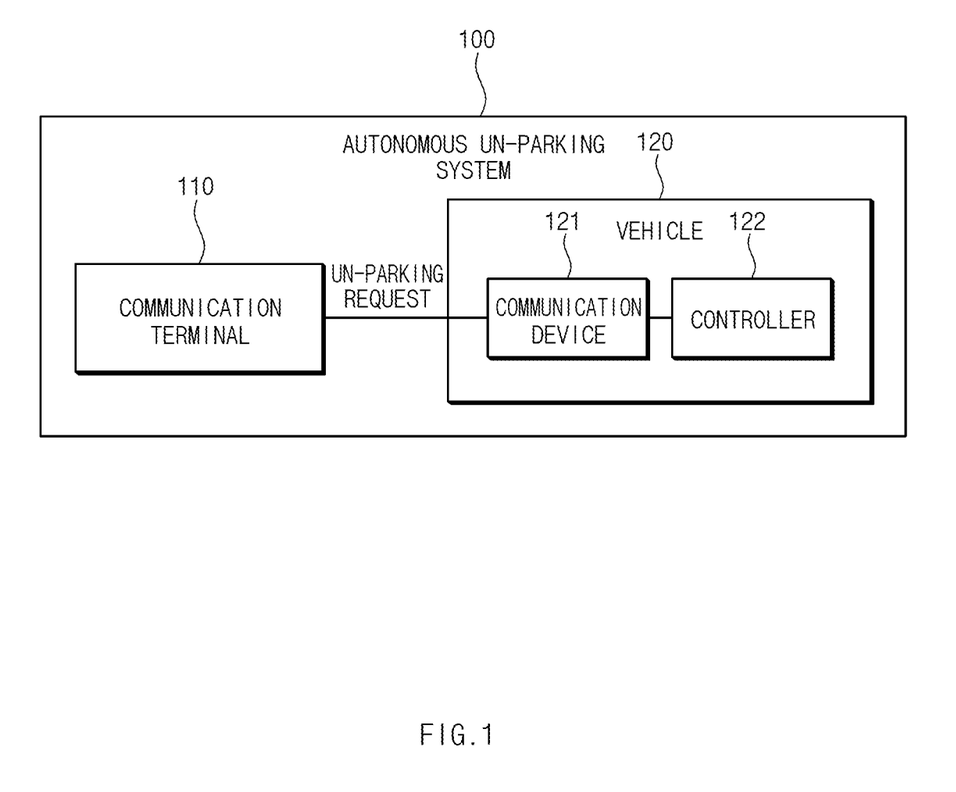
FIG. 1 is a block diagram of an autonomous un-parking system according to various exemplary embodiments of the present invention.

FIG. 1 is a block diagram of an autonomous un-parking system according to various exemplary embodiments of the present invention.

Referring to FIG. 1, an autonomous un-parking system 100 according to various exemplary embodiments of the present invention may be implemented including a communication terminal 110 outside a vehicle 120 and the vehicle 120.

The communication terminal 110 may be a communication device carried by a user, and may be any communication device having a communication function, such as a smartphone, a wearable device, a tablet PC, and the like.

The vehicle 120 may include a communication device 121 and a controller 122 disposed inside or outside the vehicle 120. The communication device 121 and the controller 122 may be integrally formed with control units of the vehicle 120, or may be implemented as a separate device and connected to the control units of the vehicle 120 by separate connection means or communication means.

The communication device 121 may include a communication module that supports a communication interface with the communication terminal 110 of the user.

As an example, the communication device 121 may receive information on an un-parking request of the vehicle 120 from the communication terminal 110 of the user. In the present connection, the information on the un-parking request may include information on a content that the user requests the un-parking of the vehicle 120.

In another example, the communication device 121 may receive information on a time that the user wants to board the vehicle from the communication terminal 110 of the user.

In another example, the communication device 121 may transmit information generated by the controller 122 to the communication terminal 110 of the user. Furthermore, information may be received from the communication terminal 110 of the user and the received information may be transmitted to the controller 122.

The controller 122 may control devices inside the vehicle 120 and overall operations of the vehicle 120. The controller 122 may be implemented in a form of hardware or software, and may also exist in a form in which the hardware and the software are combined with each other. The controller 122 may be implemented as a microprocessor, but may not be limited thereto.

Hereinafter, the controller 122 will be described in detail with reference to FIG. 2 and FIG. 3.

First, the controller 122 is a component that determines a boarding location based on the user and controls the un-parking to the boarding location.

Figure 2:
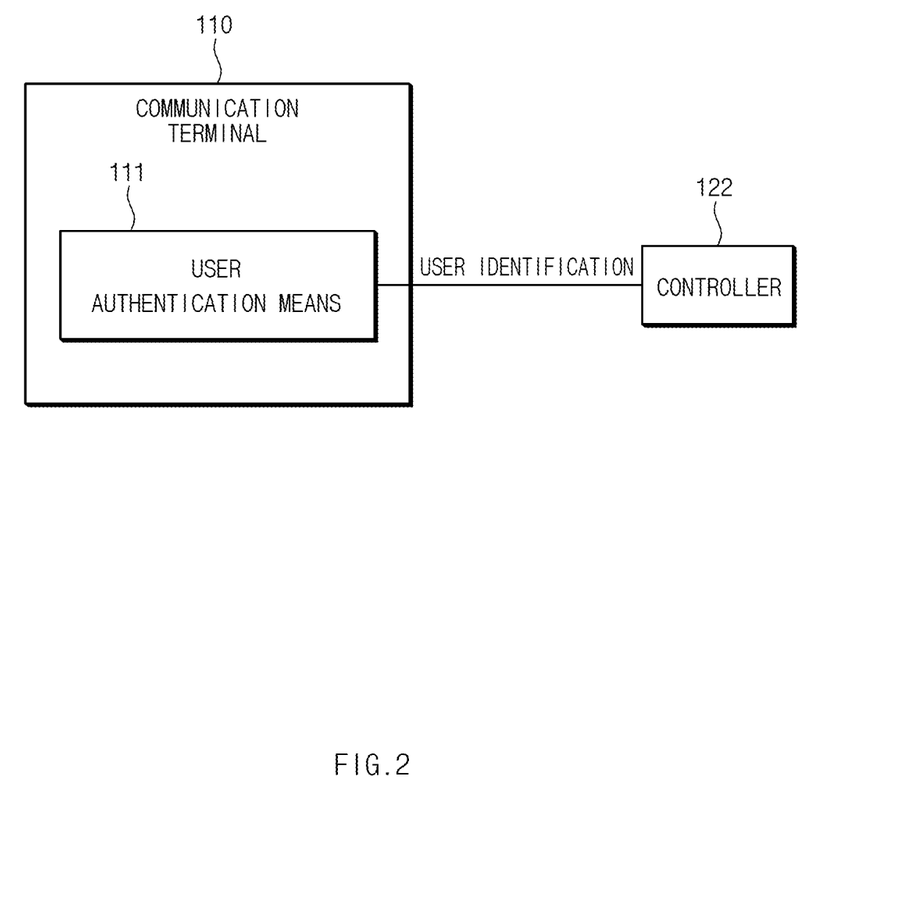
FIG. 2 is a diagram for illustrating user identification in an autonomous un-parking system according to various exemplary embodiments of the present invention.

FIG. 2 is a diagram for illustrating user identification in an autonomous un-parking system according to various exemplary embodiments of the present invention.

Referring to FIG. 2, the communication terminal 110 may include user authentication means 111.

The user authentication means 111 may be means for identifying the user. Accordingly, the user authentication means 111 may deactivate a security function of the vehicle 120.

For example, the security function of the vehicle 120 may be a function of maintaining locking of a door of the vehicle 120.

In another example, the security function of the vehicle 120 may be a locking function against starting of the vehicle 120.

For example, the user authentication means 111 may be a component including a digital key. The digital key may be a device configured for remotely unlocking the door of the vehicle 120 based on a wireless terminal including a smartphone and the like.

The controller 122 may identify the user based on the user authentication means 111. The controller 122 may identify the user by obtaining information directly from the user authentication means 111, or may identify the user by receiving the un-parking request information from the communication terminal 110 through the communication device 121 and through information obtained through an authentication process through authentication information stored in the user authentication means 111. The controller 122 may separately go through a process of obtaining information which may be a basis for identifying the user from the user authentication means 111 through the communication device 121.

The process of identifying, by the controller 122, the user may be performed through a process of directly receiving information on the user, or may be performed through a process of receiving information obtained by encrypting or modifying the information on the user and converting the received information into the information on the user.

In a process of determining the boarding location based on the user, the controller 122 may determine the boarding location in consideration of a past boarding history of the user, a tendency of the user, or past un-parking information of the user.

Figure 3:
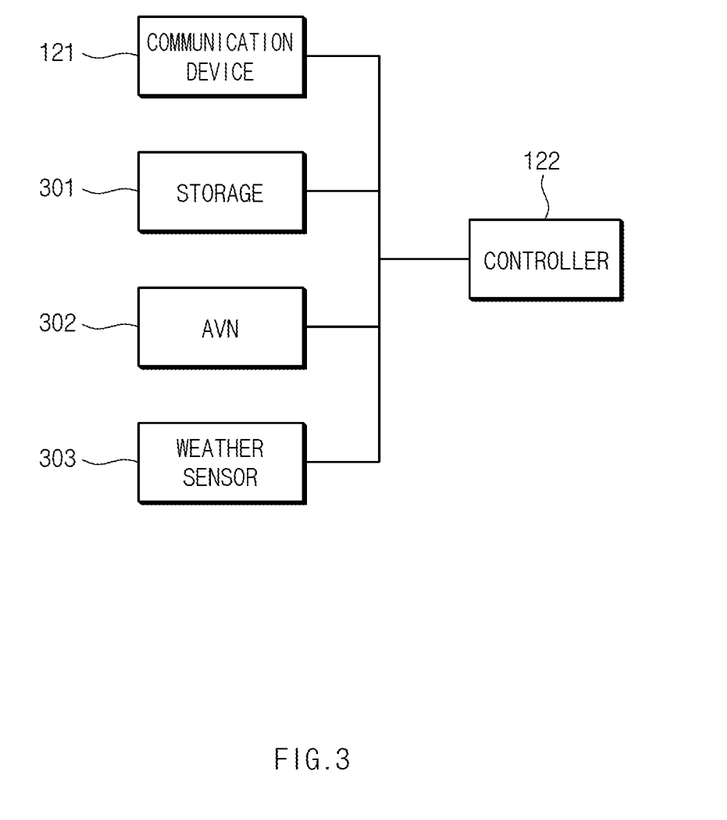
FIG. 3 is a diagram for illustrating a connection relationship of a controller in an autonomous un-parking system according to various exemplary embodiments of the present invention.

FIG. 3 is a diagram for illustrating a connection relationship of a controller in an autonomous un-parking system according to various exemplary embodiments of the present invention.

The controller 122 may be connected to the communication device 121. The controller 122 may receive the information received by the communication device 121 and may transmit information to the communication terminal 110 through the communication device 121.

The controller 122 may select one or more boarding location candidates based on the user, and may determine the boarding location based on a boarding location candidate selected by the user among the one or more boarding location candidates. In the present process, the communication device 121 may transmit information on the boarding location candidate to the communication terminal 110, and receive information on the boarding location candidate selected by the user from the communication terminal 110.

For example, in a process of selecting the one or more boarding location candidates based on the user, the controller 122 may select the boarding location candidate in consideration of the past boarding history of the user, the tendency of the user, or the past un-parking information of the user.

As an example, the controller 122 may rank the one or more boarding location candidates based on the user and select the boarding location candidate, as in an example (1. In front of GS25, 2. In front of an apartment building of a driver, 3. An underground parking lot entrance).

As an example, the communication terminal 110 may provide the information on the selected boarding location candidate to the user. The communication terminal 110 may provide the information on the boarding location candidate through a display or sound. The communication terminal 110 may provide the information on the boarding location candidate to the user through a form of a graphic user interface (GUI).

For example, the communication terminal 110 may receive the information on the boarding location candidate selected by the user from the user. The communication terminal 110 may include an input device such as a touch screen, a keyboard, a microphone, and the like to receive the information on the boarding location candidate selected by the user from the user. The user may select a desired location among the one or more boarding location candidates, but may also input the desired location among locations not suggested in the one or more boarding location candidates.

The controller 122 may be connected to storage 301. The controller 122 may perform a function of storing the information in the storage 301 and may perform a function of reading the information stored in the storage 301.

The storage 301 may be disposed in the vehicle 120, or may be separately disposed outside the vehicle 120 and connected to the controller 122 in a wired or wireless manner.

The storage 301 may store boarding information for each user. There may be a plurality of users who used the vehicle 120. In the instant case, the storage 301 may store information on locations at which the users boarded for each user.

In a process of determining the boarding location based on the user, the controller 122 may identify the past boarding history of the user based on the boarding information for each user stored in the storage 301 and the identified user, and determine the boarding location based on the past boarding history of the user.

For example, after identifying the user, the controller 122 may obtain information on the past boarding history of the user in the past by comparing the boarding information for each user stored in the storage 301 with the identified user. The controller 122 may identify the past boarding history of the user and organize boarding locations in an order of the number of boardings to determine the boarding location as a boarding location at which the user boarded the most in the past, or may determine the boarding location candidates based on the number of boardings in the past.

The controller 122 may update the boarding information for each user when the user boards the vehicle 120.

The controller 122 may be connected to an AVN 302 disposed in the vehicle 120. The controller 122 may be connected to the AVN 302 to obtain information from the AVN 302.

The AVN 302 is an abbreviation of Audio, Video, and Navigation, which may be a name for integrating devices responsible for multimedia functions of the vehicle 120. An audio function may be a function of outputting sound through a radio, a music player, or a CD. A video function may be a function of outputting a video through a DMB or an external device. A navigation function may be a function of providing information based on a map mounted on the vehicle 120.

The AVN 302 may perform communication with an external server, and may receive information on a current weather from the outside.

The controller 122 may obtain the information on the weather through the AVN 302, and may determine the boarding location based on the information on the weather and the user.

For example, when the weather obtained through the AVN 302 is rain or snow, the controller 122 may determine the boarding location as an indoor location at which the user is configured to board the vehicle without getting caught in the rain or the snow.

The controller 122 may be connected to a weather sensor 303 provided in the vehicle 120. The controller 122 may receive information on the weather detected through the weather sensor 303.

As an example, the weather sensor 303 may be a rain sensor disposed in the vehicle 120.

When the weather sensor 303 detects weather different from the weather obtained from the AVN 302 during un-parking by determining the boarding location based on the weather information obtained from the AVN 302, the controller 122 may re-select the boarding location candidates based on the weather detected by the weather sensor 303 and the user. The controller 122 may transmit the information related to the boarding location candidates to the communication terminal 110 through the communication device 121, and may receive the information related to the boarding location candidate selected by the user from the communication terminal 110 through the communication device 121. The user may select the location at which the user is desired to board the vehicle among the boarding location candidates, but may input the location at which the user is desired to board the vehicle among the locations not suggested in the boarding location candidates.

Figure 4:
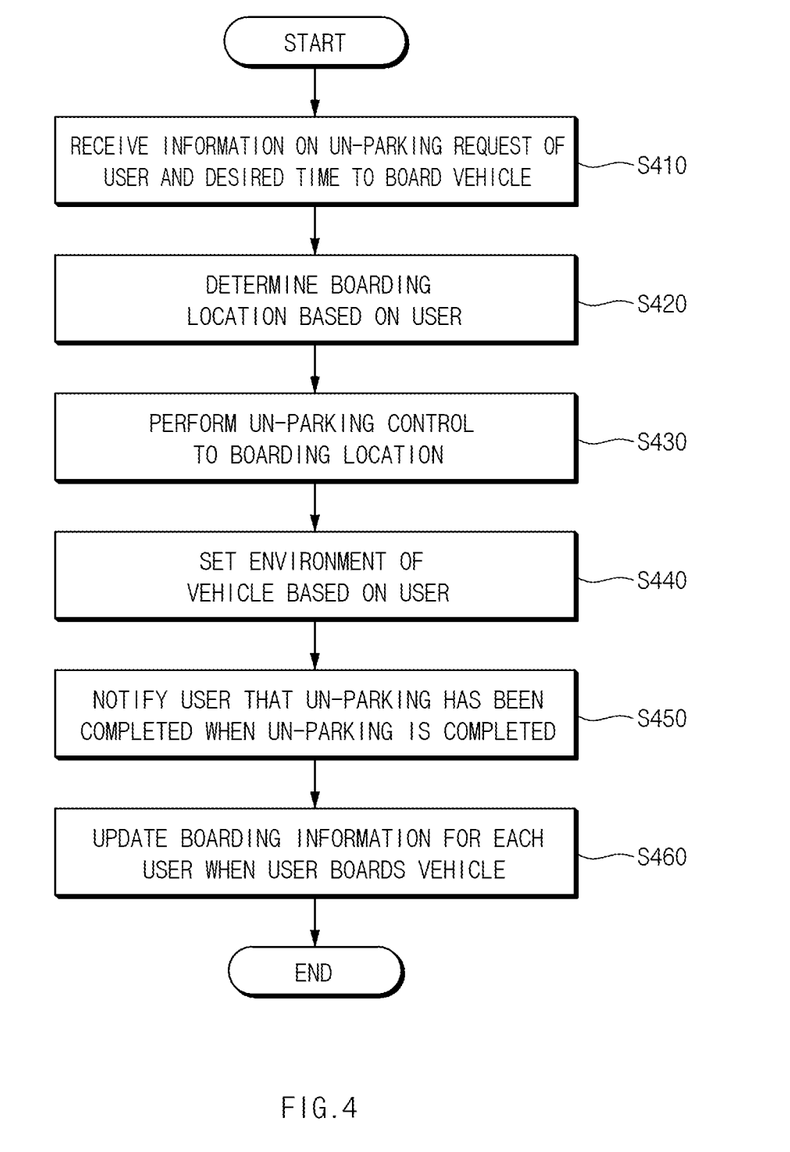
FIG. 4 is a flowchart for illustrating operations of an autonomous un-parking system according to various exemplary embodiments of the present invention.

FIG. 4 is a flowchart for illustrating operations of an autonomous un-parking system according to various exemplary embodiments of the present invention.

First, the autonomous un-parking system 100 may receive the information on the un-parking request of the user and the desired time to board the vehicle (S410).

For example, the process of receiving the information is a method of receiving the information from the user through the communication terminal 110 and transmitting, by the communication terminal 110, the information to the communication device 121 disposed in the vehicle 120. The controller 122 may receive the information from the communication device 121.

Thereafter, the autonomous un-parking system 100 may determine the boarding location based on the user (S420).

Accordingly, the autonomous un-parking system 100 may perform the un-parking control to the boarding location (S430).

For example, the performing, by the autonomous un-parking system 100, of the un-parking control to the boarding location (S430) may include controlling an operation of the vehicle 120 such that the vehicle 120 moves to the boarding location using autonomous driving.

The autonomous un-parking system 100 may set an environment of the vehicle 120 based on the user (S440).

The environment of the vehicle 120 may include at least one of a seat location, an air conditioner, a radio, or a steering wheel location of the vehicle 120.

The autonomous un-parking system 100 may adjust the seat location including a tilt of a backrest of a seat, a height of a headrest of the seat, or front and rear locations of the seat based on information previously stored by the user.

The autonomous un-parking system 100 may adjust the air conditioner, including an operation status, an operation mode, a temperature, or an intensity, based on information previously stored by the user.

The autonomous un-parking system 100 may adjust the radio, including whether the radio is operating, a volume, or a frequency, based on information previously stored by the user.

The autonomous un-parking system 100 may adjust the steering wheel location, including a height, based on information previously stored by the user.

The autonomous un-parking system 100 may transmit information indicating that the un-parking has been completed to the user when the un-parking is completed (S450).

For example, the controller 122 may transmit a message indicating that the un-parking has been completed to the communication terminal 110 through the communication device 121, and the user may receive the information indicating that un-parking has been completed through the communication terminal 110.

The autonomous un-parking system 100 may update the boarding information for each user when the user boards the vehicle (S460).

As an example, the storage 301 may store the boarding information for each user, and the controller 122 may update the boarding information for each user stored in the storage 301. The controller 122 may update the boarding information for each user in a scheme of adding new boarding information to the existing boarding information for each user.

Figure 5:
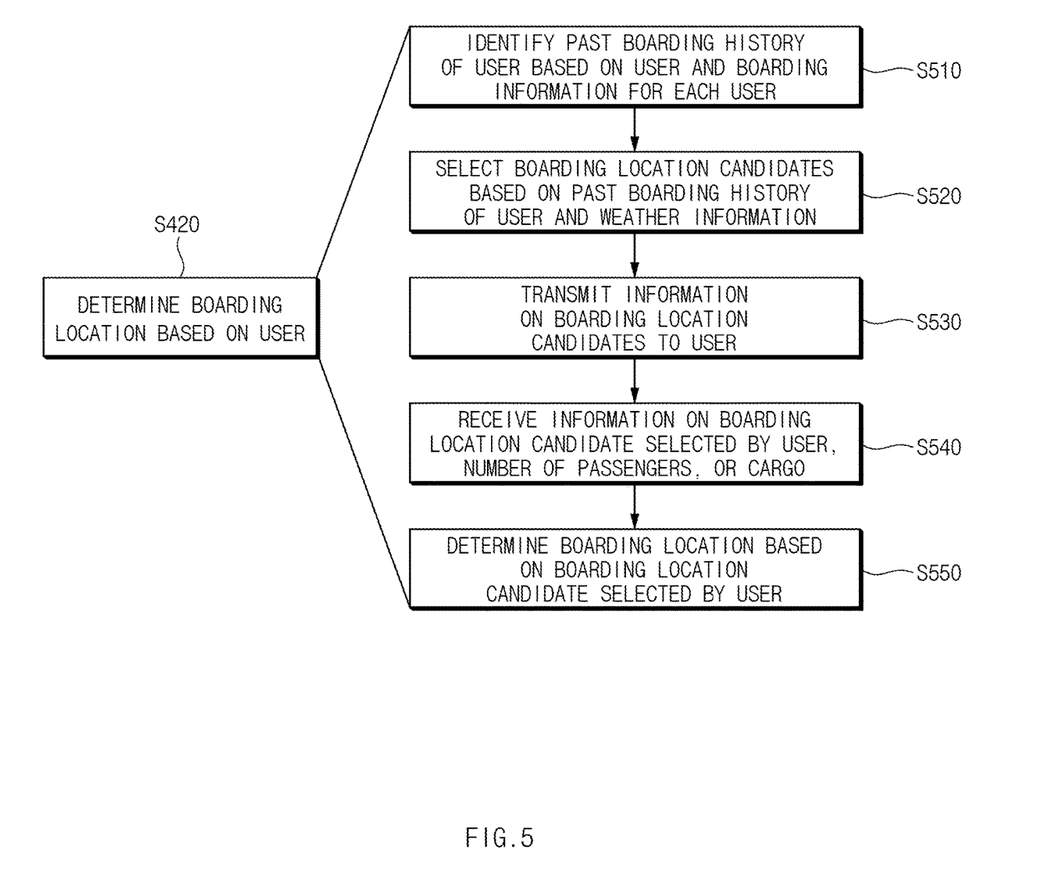
FIG. 5 is a flowchart illustrating an operation of determining a boarding location based on a user in an autonomous un-parking system according to various exemplary embodiments of the present invention.

FIG. 5 is a flowchart illustrating an operation of determining a boarding location based on a user in an autonomous un-parking system according to various exemplary embodiments of the present invention.

The autonomous un-parking system 100 may first identify the past boarding history of the user based on the user and the boarding information for each user (S510) to determine the boarding location based on the user (S420).

Accordingly, the autonomous un-parking system 100 may select the boarding location candidates based on the past boarding history of the user and the weather information (S520).

Furthermore, the autonomous un-parking system 100 may transmit the information on the boarding location candidates to the user (S530), and receive information on the boarding location candidate selected by the user, the number of passengers, or a cargo (S540).

In conclusion, the autonomous un-parking system 100 may determine the boarding location based on the boarding location candidate selected by the user (S550).

Figure 6:
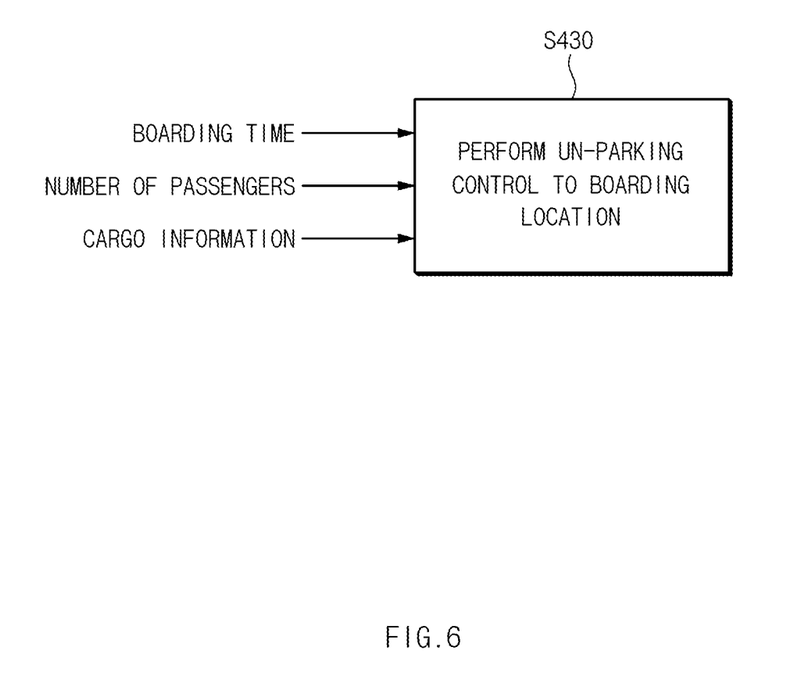
FIG. 6 is a diagram of an example illustrating an operation of controlling un-parking to a boarding location in an autonomous un-parking system according to various exemplary embodiments of the present invention.

FIG. 6 is a diagram of an example illustrating an operation of controlling un-parking to a boarding location in an autonomous un-parking system according to various exemplary embodiments of the present invention.

Referring to FIG. 6, the autonomous un-parking system 100 may perform the un-parking control to the boarding location in consideration of the time the user wants to board the vehicle in operation (S430) of performing the un-parking control to the boarding location.

As an example, the autonomous un-parking system 100 may perform the un-parking control such that the un-parking to the boarding location is completed in time or a little earlier.

The autonomous un-parking system 100 may perform the un-parking control to the boarding location in consideration of a free space around the vehicle 120 or a direction of a trunk of the vehicle 120 based on the number of passengers or the cargo in operation (S430) of performing the un-parking control to the boarding location.

For example, when the number of passengers is one (the driver), the autonomous un-parking system 100 may un-park the vehicle such that a free space around a driver's seat is wide, which is advantageous for boarding of the driver. Furthermore, when there is a fellow passenger, the autonomous un-parking system 100 may un-park the vehicle such that spaces of both sides of the vehicle 120 are empty. The autonomous un-parking system 100 may un-park the vehicle by orienting the trunk direction toward a passageway to facilitate loading of the cargo when there is the cargo such as a stroller and the like.

Figure 7:
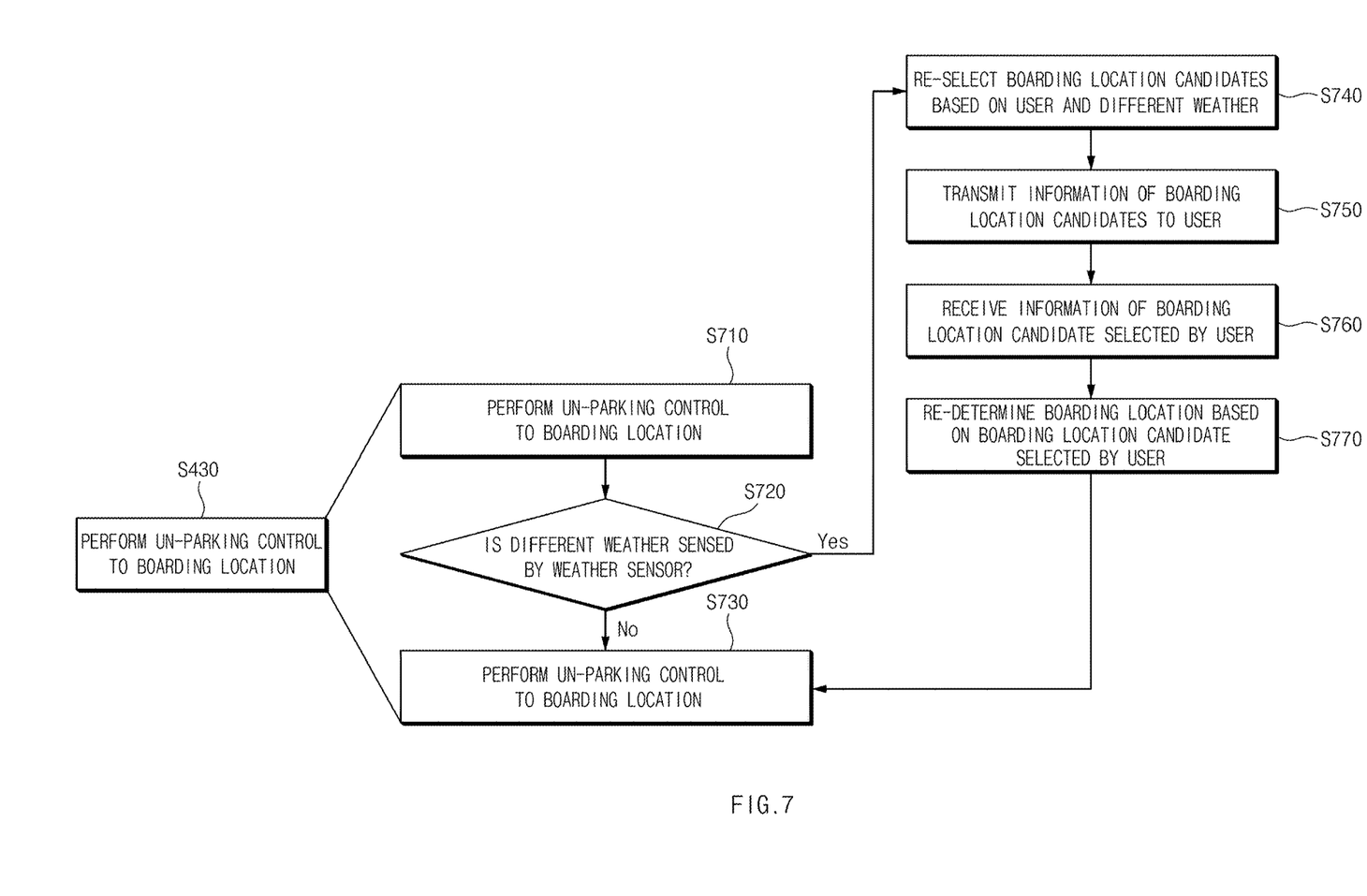
FIG. 7 is a diagram of another example illustrating an operation of controlling un-parking to a boarding location in an autonomous un-parking system according to various exemplary embodiments of the present invention.

FIG. 7 is a diagram of another example illustrating an operation of controlling un-parking to a boarding location in an autonomous un-parking system according to various exemplary embodiments of the present invention.

Referring to FIG. 7, in operation S430 of performing the un-parking control to the boarding location, the autonomous un-parking system 100 may go through operation (S720) of determining whether the weather different from the weather obtained from the AVN 302 is detected by the weather sensor 303 during the un-parking control to the boarding location (S710).

When the different weather is not detected in operation (S720) of determining whether the weather different from the weather obtained from the AVN 302 is detected by the weather sensor 303, the autonomous un-parking system 100 may continue to perform the un-parking control to the boarding location as it was (S730).

When the different weather is detected in operation (S720) of determining whether the weather different from the weather obtained from the AVN 302 is detected by the weather sensor 303, the autonomous un-parking system 100 may include operation (S740) of re-selecting the boarding location candidates based on the weather obtained by the weather sensor 303 and the user information.

Thereafter, the autonomous un-parking system 100 may transmit the information related to the re-selected boarding location candidates to the user to the communication terminal 110 through the communication device 121 (S750).

Accordingly, the autonomous un-parking system 100 may receive the information related to the boarding location candidate selected by the user through the communication terminal 110 and the communication device 121 (S760), and may re-determine the boarding location based on the boarding location candidate selected by the user (S770).

Thereafter, the autonomous un-parking system 100 may perform the un-parking control to the re-determined boarding location (S730).

Figure 8:
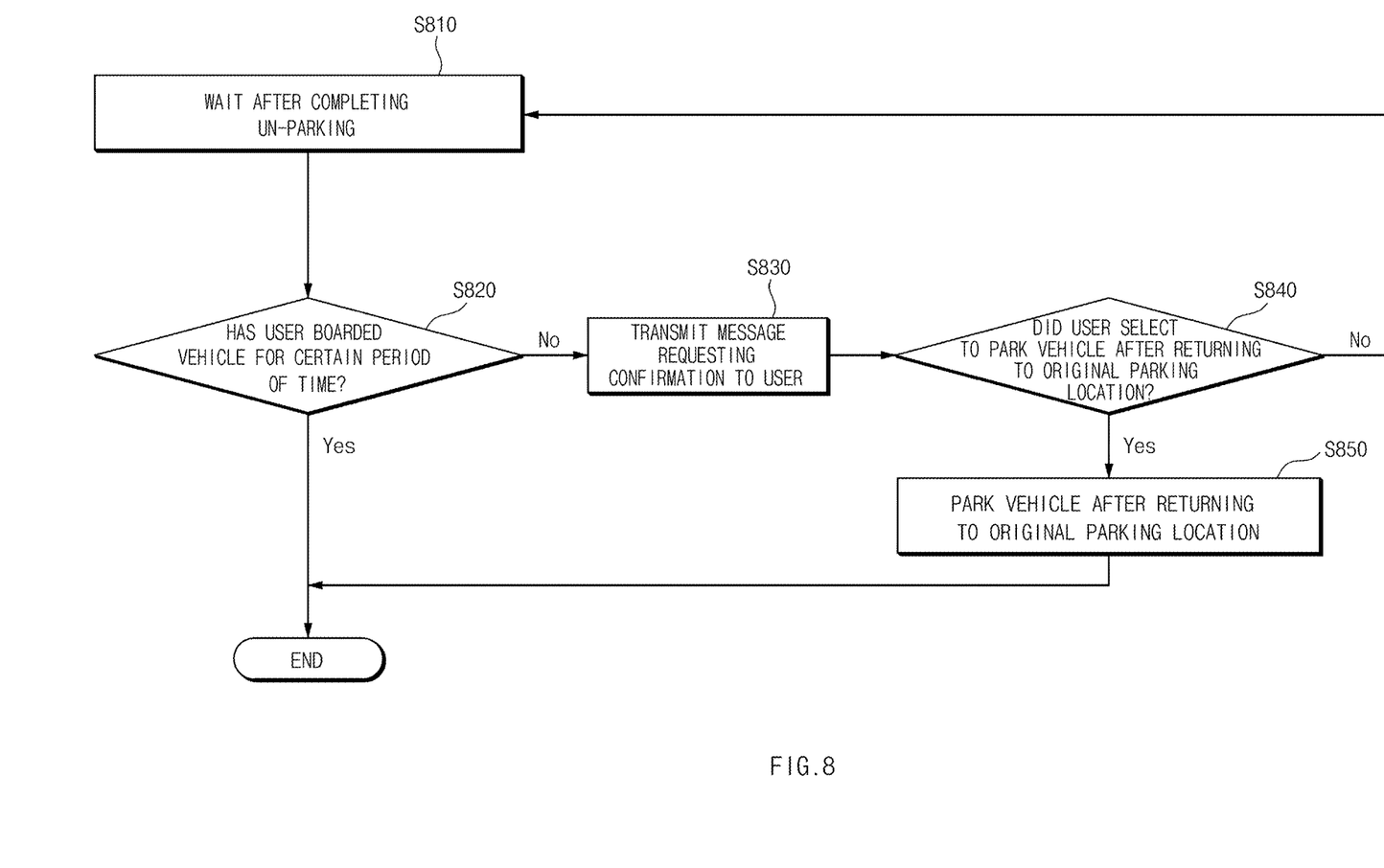
FIG. 8 is a flowchart illustrating an operation of transmitting a confirmation request message to a user in an autonomous un-parking system according to various exemplary embodiments of the present invention.

FIG. 8 is a flowchart illustrating an operation of transmitting a confirmation request message to a user in an autonomous un-parking system according to various exemplary embodiments of the present invention.

Referring to FIG. 8, the autonomous un-parking system 100 may wait until the user boards the vehicle after completing the un-parking (S810).

Furthermore, the autonomous un-parking system 100 may determine whether the user boarded the vehicle for a certain time period (S820).

The autonomous un-parking system 100 may terminate the autonomous un-parking when the user boarded the vehicle for the certain time period.

When the user did not board the vehicle for the certain time period, the autonomous un-parking system 100 may transmit a message requesting confirmation to the user (S830).

In various exemplary embodiments of the present invention, when the user did not board the vehicle for the certain time period, in the autonomous un-parking system 100, the controller 122 may transmit the message requesting the confirmation to the communication terminal 110 through the communication device 121, and the user may identify the message requesting the confirmation through the communication terminal 110.

The autonomous un-parking system 100 may receive a selection of the user corresponding to the message requesting the confirmation (S840).

For example, the autonomous un-parking system 100 may receive the selection of the user among options including a selection to park the vehicle after returning to an original parking location or a selection to wait at a current location.

When the selection of the user is the selection to wait at the current location, the autonomous un-parking system 100 may return to operation (S810) of waiting after completion of the un-parking again and determine whether the user has completed the boarding for the certain time period (S820).

When the selection of the user is to park the vehicle after returning to the original parking location, the autonomous un-parking system 100 may park the vehicle after returning to the original parking location (S850).

The autonomous un-parking system 100 may complete the parking after returning to the original parking location, and may inform the user the termination of the autonomous un-parking or the completion of the parking at the original parking location.

For example, the controller 122 may park the vehicle 120 again by controlling the vehicle 120 to the location at which the vehicle 120 was originally parked through the autonomous driving.

According to various exemplary embodiments of the present invention, the autonomous un-parking system 100 may determine the boarding location based on the current weather condition and the user, perform the autonomous un-parking to an optimal location for the user in consideration of the free space around the vehicle 120 or the direction of the trunk of the vehicle 120 based on the information related to the number of passengers or the cargo, and set the environment of the vehicle 120 based on the user.

Thus, the autonomous un-parking system 100 may perform the un-parking of the vehicle 120 through the autonomous driving to the desired location even when the user does not perform the un-parking directly, reducing a time required for the boarding. Furthermore, the autonomous un-parking system 100 may determine the location to un-park the vehicle and wait based on the number of passengers or the cargo, promoting a convenience in the vehicle boarding and loading and unloading of the cargo.

Furthermore, the autonomous un-parking system 100 may increase a user convenience by proposing the un-parking location based on the weather and the tendency of the user.

Figure 9:
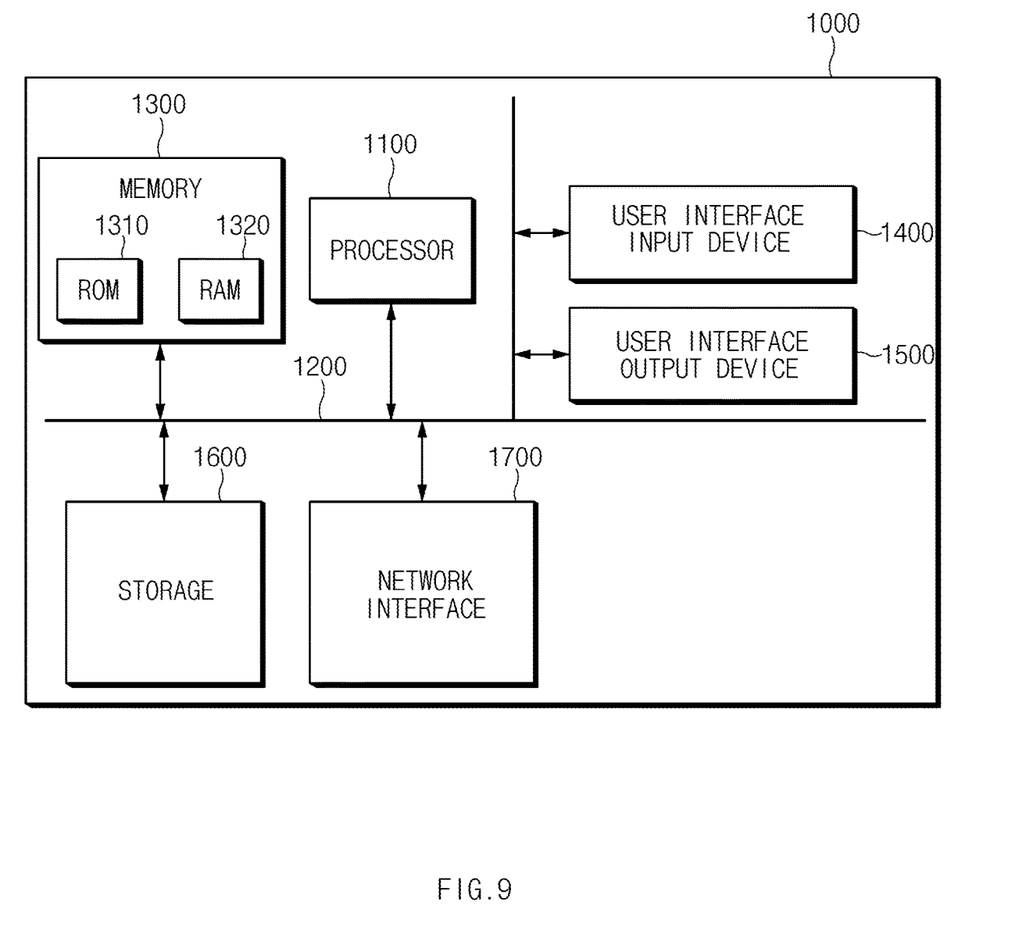
FIG. 9 illustrates a computing system according to various exemplary embodiments of the present invention.

FIG. 9 illustrates a computing system according to various exemplary embodiments of the present invention.

Referring to FIG. 9, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Therefore, the exemplary embodiments of the present invention are provided to explain the spirit and scope of the present invention, but not to limit them, so that the spirit and scope of the present invention is not limited by the embodiments. The scope of the present invention may be construed on the basis of the accompanying claims, and all the technical ideas within the scope equivalent to the claims may be included in the scope of the present invention.

Effects of the autonomous un-parking system and method according to various exemplary embodiments of the present invention will be referred to as follows.

According to at least one of the exemplary embodiments of the present invention, the customized boarding location may be determined based on the user, and the autonomous un-parking may be performed to the boarding location.

Furthermore, according to at least one of the exemplary embodiments of the present invention, the boarding location may be determined based on the past un-parking history of the user.

Furthermore, according to at least one of the exemplary embodiments of the present invention, the boarding location may be determined in consideration of the weather information.

Furthermore, according to at least one of the exemplary embodiments of the present invention, the information on the boarding location candidates may be provided to the user, so that the boarding location may be determined based on the boarding location candidate selected by the user.

Furthermore, according to at least one of the exemplary embodiments of the present invention, the un-parking may be performed in consideration of the information on the number of passengers or the cargo.

Furthermore, various effects identified directly or indirectly through the present document may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An autonomous un-parking system comprising:
   one or more processors;
   a memory storing program instructions that, when executed by the one or more processors, cause the one or more processors to:
   receive an un-parking request of a vehicle from a communication terminal including user authentication means;
   identify a user according to the user authentication means based on the user in response to the un-parking request;
   obtain information on a past boarding history of the user in the past by comparing boarding information for each user stored in a storage with the identified user;
   identify the past boarding history of the user;
   organize boarding locations in an order of a number of boardings;
   determine a boarding location in consideration of the boarding location at which the user boarded the most in the past, a tendency of the user, and past un-parking information of the user; and
   control un-parking of the vehicle to the determined boarding location to move the vehicle to the determined boarding location using autonomous driving.

2. The autonomous un-parking system of claim 1, wherein the program instructions, when executed by the one or more processors, further cause the one or more processors to:
   select one or more boarding location candidates based on the user;
   determine the boarding location based on a boarding location candidate selected by the user among the one or more boarding location candidates;
   transmit information on the one or more boarding location candidates to the communication terminal; and
   receive information on the boarding location candidate selected by the user from the communication terminal.

3. The autonomous un-parking system of claim 1, wherein the program instructions, when executed by the one or more processors, further cause the one or more processors to update the boarding information for the user upon determining that the user boards the vehicle.

4. The autonomous un-parking system of claim 1, wherein the program instructions, when executed by the one or more processors, further cause the one or more processors to determine the boarding location based on information on a weather obtained through an Audio, Video, and Navigation (AVN) device of the vehicle and the user.

5. The autonomous un-parking system of claim 4,
wherein the program instructions, when executed by the one or more processors, further cause the one or more processors to:
select one or more boarding location candidates upon determining that a weather different from the weather obtained through the AVN device is detected during the un-parking, based on the user and the different weather;
re-determine the boarding location based on a boarding location candidate selected by the user among the one or more boarding location candidates,
transmit information on the one or more boarding location candidates to the communication terminal; and
receive information on the boarding location candidate selected by the user from the communication terminal.

6. The autonomous un-parking system of claim 1,
wherein the program instructions, when executed by the one or more processors, further cause the one or more processors to:
receive information on a number of passengers or a cargo from the communication terminal; and
control the vehicle to be parked or stopped in consideration of a free space around the vehicle or a direction of a trunk of the vehicle that are determined to be convenient for the user to board the vehicle or load the cargo based on the number of passengers or the cargo.

7. The autonomous un-parking system of claim 1,
wherein the program instructions, when executed by the one or more processors, further cause the one or more processors to set, based on the user, an environment of the vehicle including at least one of a seat location, an air conditioner, a radio, or a steering wheel location of the vehicle.

8. The autonomous un-parking system of claim 1,
wherein the program instructions, when executed by the one or more processors, further cause the one or more processors to:
receive information on a time that the user wants to board the vehicle from the communication terminal, and
control the un-parking to the boarding location in consideration of the time.

9. The autonomous un-parking system of claim 1,
wherein the program instructions, when executed by the one or more processors, further cause the one or more processors to transmit information indicating that the un-parking has been completed to the communication terminal through a communication device upon determining that the un-parking is completed.

10. The autonomous un-parking system of claim 1, wherein the program instructions, when executed by the one or more processors, further cause the one or more processors to:
transmit a message requesting confirmation to the communication terminal through a communication device upon determining that the user does not board the vehicle for a predetermined time period after the un-parking has completed;
obtain, through the communication terminal, a selection of the user on whether the vehicle will wait at a current location or will be parked after returning to an original parking location; and
control the vehicle based on the selection of the user.

11. An autonomous un-parking method comprising:
receiving, by a controller, an un-parking request of a vehicle from a communication terminal including user authentication means;
identifying, by the controller, a user according to the user authentication means based on the user in response to the un-parking request;
obtaining, by the controller, information on a past boarding history of the user in the past by comparing boarding information for each user stored in a storage with the identified user,
identifying, by the controller, the past boarding history of the user;
organizing, by the controller, boarding locations in an order of a number of boardings;
determining, by the controller, a boarding location in consideration of the boarding location at which the user boarded the most in the past, a tendency of the user, and past un-parking information of the user; and
controlling, by the controller, un-parking of the vehicle to the determined boarding location to move the vehicle to the boarding location using autonomous driving.

12. The autonomous un-parking method of claim 11, wherein the determining of the boarding location based on the user in response to the un-parking request includes:
selecting one or more boarding location candidates based on the user;
transmitting information on the one or more boarding location candidates to the communication terminal;
receiving information on a boarding location candidate selected by the user from the communication terminal; and
determining the boarding location based on the boarding location candidate selected by the user.

13. The autonomous un-parking method of claim 11, further including:
updating boarding information for the user when the user boards the vehicle.

14. The autonomous un-parking method of claim 11, wherein the determining of the boarding location based on the user includes:
determining the boarding location based on information on a weather obtained through an AVN device of the vehicle and the user.

15. The autonomous un-parking method of claim 14, further including:
selecting one or more boarding location candidates when a weather different from the weather obtained through the AVN device is detected during the un-parking, based on the user and the different weather;
transmitting information on the one or more boarding location candidates to the communication terminal;
receiving information on a boarding location candidate selected by the user from the communication terminal;
re-determining the boarding location based on the boarding location candidate selected by the user; and
performing the un-parking to the re-determined boarding location.

16. The autonomous un-parking method of claim 11, further including:
receiving information on a number of passengers or a cargo from the communication terminal,
wherein the controlling of the un-parking of the vehicle to the boarding location includes:
controlling the vehicle to be parked or stopped in consideration of a free space around the vehicle or a direction of a trunk of the vehicle that are determined to be convenient for the user to board the vehicle or load the cargo based on the number of passengers or the cargo.

17. The autonomous un-parking method of claim 11, further including:
setting, based on the user, an environment of the vehicle including at least one of a seat location, an air conditioner, a radio, or a steering wheel location of the vehicle.

18. The autonomous un-parking method of claim 11, further including:
receiving information on a time that the user wants to board the vehicle from the communication terminal,
wherein the controlling of the un-parking of the vehicle to the boarding location includes:
controlling the un-parking to the boarding location in consideration of the time.

19. The autonomous un-parking method of claim 11, further including:
transmitting information indicating that the un-parking has been completed to the communication terminal when the un-parking is completed.

20. The autonomous un-parking method of claim 11, further including:
transmitting a message requesting confirmation to the communication terminal when the user does not board the vehicle for a predetermined time period after the un-parking has completed;
obtaining, through the communication terminal, a selection of the user on whether the vehicle will wait at a current location or will be parked after returning to an original parking location; and
controlling the vehicle based on the selection of the user.

* * * * *